(12) United States Patent
Sugimoto

(10) Patent No.: US 9,505,285 B2
(45) Date of Patent: Nov. 29, 2016

(54) ANTI-VIBRATION DEVICE

(71) Applicant: BRIDGESTONE CORPORATION, Chuo-ku, Tokyo (JP)

(72) Inventor: Yukihiro Sugimoto, Fujisawa (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days.

(21) Appl. No.: 14/765,078

(22) PCT Filed: Jan. 10, 2014

(86) PCT No.: PCT/JP2014/000091
§ 371 (c)(1),
(2) Date: Jul. 31, 2015

(87) PCT Pub. No.: WO2014/129099
PCT Pub. Date: Aug. 28, 2014

(65) Prior Publication Data
US 2015/0367696 A1 Dec. 24, 2015

(30) Foreign Application Priority Data

Feb. 25, 2013 (JP) ................................. 2013-034799

(51) Int. Cl.
*B60G 13/04* (2006.01)
*F16F 1/38* (2006.01)

(52) U.S. Cl.
CPC ............. *B60G 13/04* (2013.01); *F16F 1/3828* (2013.01); *F16F 1/3849* (2013.01); *B60G 2202/25* (2013.01); *B60G 2500/10* (2013.01)

(58) Field of Classification Search
CPC .... F16F 1/3828; F16F 1/3849; B60G 13/04; B60G 2202/25; B60G 2500/10
See application file for complete search history.

(56) References Cited

U.S. PATENT DOCUMENTS 2,608,751 A * 9/1952 Hutton .................... B25B 27/28
29/450
4,889,328 A * 12/1989 Uno ....................... B60G 99/00
248/559

(Continued)

FOREIGN PATENT DOCUMENTS

CN 1707133 A 12/2005
DE 102011056013 A1 * 6/2013 ............ F16F 1/3828

(Continued)

OTHER PUBLICATIONS

Apr. 8, 2014 International Search Report issued in International Patent Application No. PCT/JP2014/000091.

*Primary Examiner* — Laura Freedman
(74) *Attorney, Agent, or Firm* — Kenja IP Law PC

(57) ABSTRACT

An anti-vibration device includes: an inner cylinder connected to one of a vibration generating portion and a vibration receiving portion; an outer cylinder connected to the other one of the vibration generating portion and the vibration receiving portion; an intermediate cylinder pressed in an inner periphery of the outer cylinder; a main elastic body connecting the inner cylinder and the intermediate cylinder; and a stopper elastic body independent of the main elastic body, the stopper elastic body being fixed to the intermediate cylinder and facing, in a direction orthogonal to an axial direction of the inner cylinder, the inner cylinder with at least a cavity in between, the cavity being formed through the main elastic body in the inner cylinder axial direction, wherein the stopper elastic body has an axial stopper portion that protrudes beyond the intermediate cylinder and the outer cylinder in the inner cylinder axial direction.

5 Claims, 3 Drawing Sheets

(56) References Cited

U.S. PATENT DOCUMENTS

| | | | | |
|---|---|---|---|---|
| 5,246,248 | A * | 9/1993 | Ferguson | B60G 21/051 267/141.3 |
| 5,595,373 | A * | 1/1997 | Ikeda | F16F 13/14 267/140.12 |
| 5,899,431 | A * | 5/1999 | Lefol | F16F 1/387 248/638 |
| 6,216,833 | B1 * | 4/2001 | Lefferts | B60N 2/682 188/380 |
| 6,386,529 | B2 * | 5/2002 | Bik | F16F 13/16 267/140.13 |
| 6,419,213 | B2 * | 7/2002 | Murai | F16F 13/14 267/140.12 |
| 6,659,435 | B2 * | 12/2003 | Yamaguchi | B60G 15/063 267/140.12 |
| 6,705,600 | B2 * | 3/2004 | Yamaguchi | F16F 13/16 267/140.11 |
| 7,198,258 | B2 * | 4/2007 | Sato | F16F 13/16 267/140.13 |
| 7,234,693 | B2 * | 6/2007 | Schnaars | F16F 1/3863 267/140.11 |
| 7,350,775 | B2 * | 4/2008 | Sato | F16F 13/1445 267/140.12 |
| 7,922,157 | B2 * | 4/2011 | Hayashi | F16F 1/3828 267/140.12 |
| 8,181,945 | B2 * | 5/2012 | Miyahara | F16F 1/387 267/140.12 |
| 8,794,608 | B2 * | 8/2014 | Kato | F16F 1/3849 267/140.2 |
| 8,973,931 | B2 * | 3/2015 | Branger | B60G 7/02 267/276 |
| 2005/0206057 | A1 * | 9/2005 | Endo | F16F 1/3849 267/292 |
| 2007/0272051 | A1 * | 11/2007 | Kamei | B60G 7/001 74/579 R |
| 2013/0134641 | A1 * | 5/2013 | Yanagi | F16F 1/3828 267/141.2 |
| 2014/0151946 | A1 * | 6/2014 | Yokawa | F16F 1/3849 267/292 |
| 2015/0204405 | A1 * | 7/2015 | Shimada | F16F 1/38 267/141.2 |
| 2015/0323029 | A1 * | 11/2015 | Yahata | B60G 7/006 267/141.2 |
| 2015/0323031 | A1 * | 11/2015 | Yahata | F16F 1/3863 267/141.2 |

FOREIGN PATENT DOCUMENTS

| | | | |
|---|---|---|---|
| JP | S60-43742 | U | 3/1985 |
| JP | S60-043742 | U | 3/1985 |
| JP | H08177917 | A | 7/1996 |
| JP | 08338465 | A * | 12/1996 |
| JP | 11020481 | A * | 1/1999 |
| JP | 2001-280386 | A | 10/2001 |
| JP | 2001-295886 | A | 10/2001 |
| JP | 2002317843 | A | 10/2002 |
| JP | 2003206977 | A | 7/2003 |
| JP | 2004183725 | A * | 7/2004 |
| JP | 2005-188575 | A | 7/2005 |
| JP | 2005256989 | A | 9/2005 |
| JP | 2006292074 | A * | 10/2006 |
| JP | 2008-45710 | A | 2/2008 |
| JP | 4081114 | B2 | 4/2008 |
| SE | WO 2014092630 | A1 * | 6/2014 ............ F16F 1/387 |
| WO | 2005018904 | A1 | 3/2005 |

* cited by examiner

ANTI-VIBRATION DEVICE

TECHNICAL FIELD

The disclosure relates to an anti-vibration device used in a car and the like.

BACKGROUND

As an anti-vibration device for vehicles, an anti-vibration mounting device attached between the vibration generating portion such as the engine and the vehicle body in the longitudinal (front-back) direction of the vehicle is known, for example as described in Patent Literature (PTL) 1. Typically, this type of anti-vibration mounting device has its characteristics optimized in the longitudinal direction of the vehicle, and tends to have lower stiffness (spring constant) in the vertical direction or lateral direction (the inner cylinder axial direction) of the vehicle. Accordingly, for example when the vehicle makes a sharp turn or rides over a bump, the outer cylinder of the anti-vibration mounting device may hit the vehicle body and generate hitting noise.

In the anti-vibration mounting device described in PTL 1, rubber protrusions protruding outward from both axial ends of the outer cylinder are provided on both axial side surfaces of a rubber elastic body connecting the inner cylinder and the outer cylinder, to prevent the outer cylinder from hitting the vehicle body.

CITATION LIST

Patent Literature

PTL 1: JP 2005-188575 A

SUMMARY

Technical Problem

The rubber protrusions on the rubber elastic body is problematic in that design changes are not easy because the characteristics of the rubber elastic body in response to vibration input in the longitudinal direction (principal vibration direction) of the vehicle change. Besides, in the case where the rubber protrusions are provided on the rubber elastic body, the rubber protrusions and the vehicle body repeatedly come into contact with each other during vibration input, which may affect the durability of the rubber elastic body itself.

It could be helpful to provide an anti-vibration device in which a stopper function for displacements in the inner cylinder axial direction of the anti-vibration device is added without changing the characteristics of the main elastic body with respect to vibration input in the principal vibration direction and without affecting the durability of the main elastic body.

Solution to Problem

The disclosed anti-vibration device includes: an inner cylinder connected to one of a vibration generating portion and a vibration receiving portion; an outer cylinder connected to the other one of the vibration generating portion and the vibration receiving portion; an intermediate cylinder pressed in an inner periphery of the outer cylinder; a main elastic body connecting the inner cylinder and the intermediate cylinder; and a stopper elastic body independent of the main elastic body, the stopper elastic body being fixed to the intermediate cylinder and facing, in a direction orthogonal to an axial direction of the inner cylinder, the inner cylinder with at least a cavity in between, the cavity being formed through the main elastic body in the axial direction of the inner cylinder, in which the stopper elastic body has an axial stopper portion that protrudes beyond the intermediate cylinder and the outer cylinder in the axial direction of the inner cylinder.

In this specification, the expression that the main elastic body and the stopper elastic body are "independent" of each other means that the main elastic body and the stopper elastic body are deformable independently of each other and the main elastic body is, in its anti-vibration function, not affected by the stopper elastic body. This includes, for example, the case where the main elastic body and the stopper elastic body are connected via a thin elastic body portion secured to the intermediate cylinder for manufacturing reasons.

In this specification, the term "axial stopper portion" includes not only the case where the stopper portion extends along the axial direction of the inner cylinder but also the case where the stopper portion extends in a state of being tilted or curved with respect to the axial direction of the inner cylinder.

Advantageous Effect

It is thus possible to provide an anti-vibration device in which a stopper function for displacements in the inner cylinder axial direction of the anti-vibration device is added without changing the characteristics of the main elastic body with respect to vibration input in the principal vibration direction and without affecting the durability of the main elastic body.

DETAILED DESCRIPTION

The following illustrates and describes embodiments of the disclosed anti-vibration device with reference to drawings.

Figure 1:
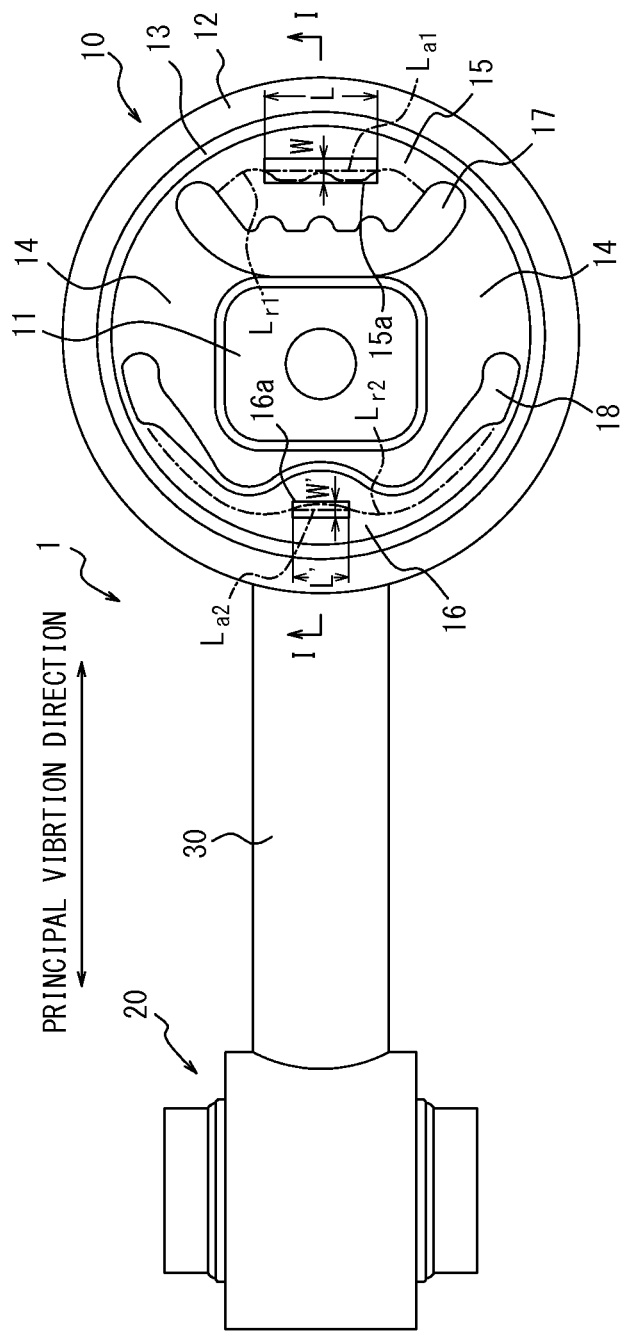
FIG. 1 is a plan view illustrating an embodiment of the disclosed anti-vibration device.
Figure 2:
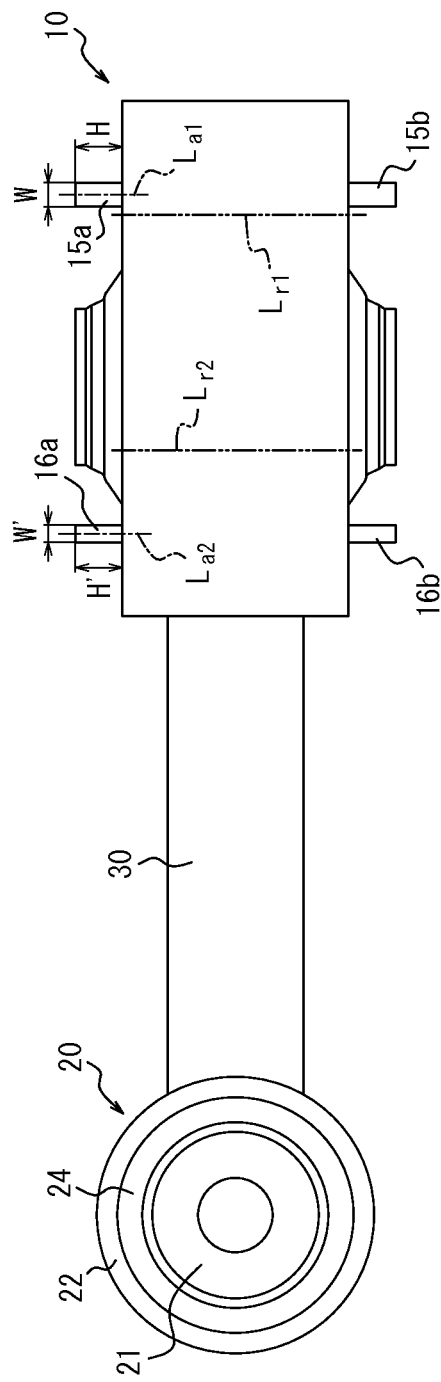
FIG. 2 is a side view of the anti-vibration device illustrated in FIG. 1.

An anti-vibration device 1 in an embodiment illustrated in FIGS. 1 and 2 is a torque rod including: a first elastic bush 10; a second elastic bush 20 smaller in diameter than the first elastic bush 10; and a connecting rod 30 connecting the first elastic bush 10 and the second elastic bush 20.

As illustrated in FIG. 1, the first elastic bush 10 includes: an inner cylinder 11; an intermediate cylinder 13; a main elastic body 14 connecting the inner cylinder 11 and the intermediate cylinder 13; a stopper elastic body 15 fixed to the intermediate cylinder 13 and facing, in the direction orthogonal to the axial direction of the inner cylinder 11 (the direction perpendicular to the paper surface of FIG. 1, hereafter also referred to as "inner cylinder axial direction"), the inner cylinder 11 with a cavity 17 in between, the cavity 17 being formed through the main elastic body 14 in the inner cylinder axial direction; and a stopper elastic body 16 fixed to the intermediate cylinder 13 and facing, in the direction orthogonal to the inner cylinder axial direction, the inner cylinder 11 with the main elastic body 14 and a cavity 18 in between, the cavity 18 being formed through the main elastic body 14 in the inner cylinder axial direction. The intermediate cylinder 13 is pressed in the inner periphery of an outer cylinder 12.

Each of the stopper elastic bodies 15 and 16 is independent of the main elastic body 14, and protrudes from the intermediate cylinder 13 side toward the inner cylinder 11.

Although the stopper elastic bodies 15 and 16 are directly secured (fixed) to the intermediate cylinder 13 by vulcanization adhesion or the like in this embodiment, at least one of the stopper elastic bodies 15 and 16 may be, for example, indirectly fixed to the intermediate cylinder 13 via another member.

In this embodiment, the inner cylinder 11 of the first elastic bush 10 is connected to an engine (not illustrated) which is a vibration generating portion by bolts or the like. The outer cylinder 12 of the first elastic bush 10 is connected to a vehicle body (not illustrated) which is a vibration receiving portion by bolts or the like via the connecting rod 30 and the second elastic bush 20, where the longitudinal direction of the connecting rod 30 is the longitudinal direction of the vehicle (i.e. the principal vibration direction of the anti-vibration device 1 is the longitudinal direction of the vehicle). Thus, the anti-vibration device 1 is attached between the vibration generating portion such as the engine and the vehicle body so that the longitudinal direction of the connecting rod 30 corresponds to the longitudinal direction of the vehicle. As a result, the vibration of the vibration generating portion can be prevented from being transmitted to the vehicle body.

The following structure is also possible, though its description is omitted here: The inner cylinder 11 of the first elastic bush 10 is connected to the vehicle body as the vibration receiving portion, and the outer cylinder 12 of the first elastic bush 10 is connected to the engine as the vibration generating portion via the connecting rod 30 and the second elastic bush 20.

The stopper elastic bodies 15 and 16 extend along the inner cylinder axial direction, and respectively have axial stopper portions 15a and 16a that protrude beyond the intermediate cylinder 13 and the outer cylinder 12 toward the vehicle body in the inner cylinder axial direction, as illustrated in FIG. 2.

The second elastic bush 20 includes: a second inner cylinder 21; and a second outer cylinder 22 connected to the outer cylinder 12 via the connecting rod 30, and arranged radially outside the second inner cylinder 21 with a second main elastic body 24 in between. The axial direction of the inner cylinder 11 of the first elastic bush 10 and the axial direction of the second inner cylinder 21 of the second elastic bush 20 are different from each other, e.g. orthogonal to each other.

The following describes the functions of the anti-vibration device 1 in this embodiment.

Suppose the anti-vibration device 1 is connected to the engine as the vibration generating portion and the vehicle body as the vibration receiving portion, as mentioned above. When the engine connected to the inner cylinder 11 vibrates in the longitudinal direction, lateral direction, and/or vertical direction of the vehicle, the vibration is absorbed by the elastic deformation of the main elastic body 14 interposed between the inner cylinder 11 and the intermediate cylinder 13. Thus, the vibration of the engine is prevented from being transmitted to the vehicle body.

When the main elastic body 14 is displaced significantly in the direction orthogonal to the inner cylinder axial direction, the stopper elastic bodies 15 and 16 function as stoppers. By forming the stoppers as elastic bodies, hitting noise upon contact can be reduced.

Figure 3:
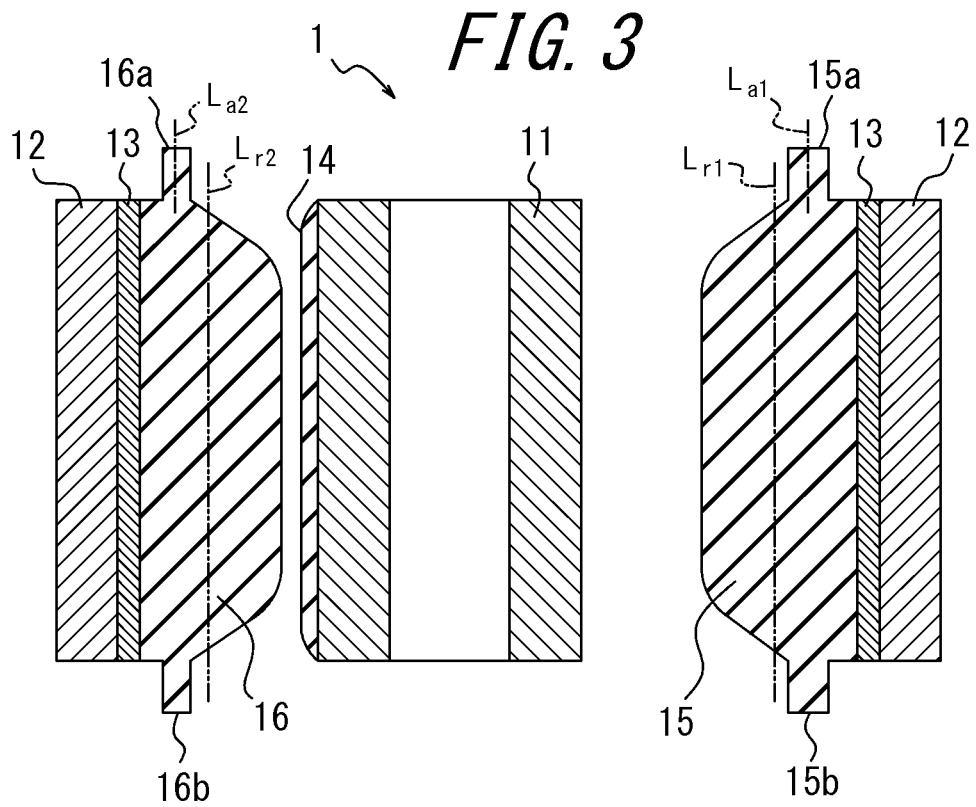
FIG. 3 is a sectional view along the inner cylinder axial direction of a first elastic bush, taken along line I-I in FIG. 1.

In this embodiment, the stopper elastic bodies 15 and 16 gradually increase in thickness toward the intermediate cylinder 13 respectively from their ends on the inner cylinder 11 side to the lower ends of the axial stopper portions 15a and 16a on the inner cylinder 11 side in the cross section along the inner cylinder axial direction, as illustrated in FIG. 3 which is a sectional view taken along line I-I in FIG. 1 (a sectional view along the inner cylinder axial direction and particularly including the principal vibration direction). This enables such contact by the stopper elastic body 15 or 16 that is initially soft and then gradually becomes firm. The ride quality can be improved in this way.

In contrast, when the inner cylinder 11 and outer cylinder 12 of the first elastic bush 10 are relatively displaced significantly in the inner cylinder axial direction as a result of, for example, the vehicle making a sharp turn or riding over a bump, the axial stopper portions 15a and 16a provided respectively in the stopper elastic bodies 15 and 16 function as stoppers. The outer cylinder 12 can thus be prevented from hitting the vehicle body. The addition of such axial stopper portions 15a and 16a hardly affects the manufacturing cost, because merely a depression needs to be added to a rubber mold and the increase in the amount of rubber due to the addition is slight.

In the disclosed anti-vibration device, the axial stopper portions 15a and 16a are provided not in the main elastic body 14 but in the stopper elastic bodies 15 and 16. By doing so, a stopper function for displacements in the inner cylinder axial direction can be added without changing the characteristics of the main elastic body 14 with respect to vibration input in the principal vibration direction and without affecting the durability of the main elastic body. Therefore, for example, even in the case where the problem of hitting noise between the vehicle body and the outer cylinder is found after the design of the anti-vibration device is completed, the problem can be resolved easily.

Moreover, no force acts on the main elastic body 14 while the axial stopper portions 15a and 16a function. This ensures the durability of the main elastic body 14.

Since the stopper elastic bodies are fixed to the intermediate shaft, by providing the axial stopper portions in the stopper elastic bodies, the axial stopper portions can be positioned away from the inner cylinder 11 (i.e. not close to the inner cylinder but close to the intermediate cylinder) in the principal vibration direction (the longitudinal direction of the vehicle in the embodiment illustrated in FIGS. 1 and 2). In this case, the axial stopper portions are positioned closer to the intermediate cylinder as the fixed ends of the stopper elastic bodies, with it being possible to improve the stiffness of the stopper elastic bodies in the inner cylinder axial direction and enhance the axial stopper function.

In the disclosed anti-vibration device, in the cross section orthogonal to the inner cylinder axial direction, the center line $L_{a1}$ of the axial stopper portion 15a is preferably closer to the intermediate cylinder 13 than the center line $L_{r1}$ of the stopper elastic body 15, and the center line $L_{a2}$ of the axial stopper portion 16a is preferably closer to the intermediate cylinder 13 than the center line $L_{r2}$ of the stopper elastic body 16, as illustrated in FIGS. 1 to 3.

In these cases, the axial stopper portions 15a or 16b is positioned closer to the intermediate cylinder 13 as the fixed ends of the stopper elastic bodies 15 and 16, with it being possible to improve the stiffness of the stopper elastic bodies 15 or 16 in the inner cylinder axial direction and further enhance the axial stopper function. Moreover, since the axial stopper portions 15a or 16b is positioned near the intermediate cylinder 13, the stopper elastic bodies 15 or 16 is not particularly thick near the inner cylinder 11, enabling such contact by the stopper elastic body 15 or 16 that is initially soft. Hence, good ride quality may be maintained even with the provision of the axial stopper portions 15a and 16a.

Here, the "center line" of each of the axial stopper portions 15a and 16a or each of the stopper elastic bodies 15 and 16 is a straight line passing through the center of the width of the axial stopper portions or the stopper elastic bodies in the radial direction of the outer cylinder 12. In the case where the center of the width of the stopper elastic body 15 and/or 16 in the radial direction of the outer cylinder 12 differs in the axial direction of the outer cylinder 12 as illustrated in FIG. 3, the above-mentioned center means the average in the axial direction of the outer cylinder 12. The same applies to the axial stopper portions 15a and 16a.

For the effective stopper function of the axial stopper portions 15a and 16a, it is preferable that the respective lengths L and L' of the axial stopper portions 15a and 16a in FIG. 1 are 30 mm or more, the respective widths W and W' of the axial stopper portions 15a and 16a in the outer cylinder radial direction in FIG. 1 are 3 mm or more, and the respective heights H and H' of the axial stopper portions 15a and 16a in the inner cylinder axial direction in FIG. 2 are 3 mm or more.

Note that at least one of the stopper elastic bodies 15 and 16 may be provided with an axial stopper portion. In the case of providing an axial stopper portion only in one of the stopper elastic bodies 15 and 16, the axial stopper portion is preferably provided in the stopper elastic body 15 located on the opposite side of the inner cylinder 11 to the second elastic bush 20. In this way, the part of the outer cylinder 12 on the opposite side of the inner cylinder 11 to the second elastic bush 20, which is displaced significantly, may be effectively prevented from hitting the vehicle body, and also the durability of the stopper elastic body 16 having no axial stopper portion may be ensured.

The axial stopper portions are to be provided on at least one side of the stopper elastic bodies in the inner cylinder axial direction where the axial end edges of the outer cylinder 12 face the vehicle body or the like. In the case where axial stopper portions 15b and 16b are also provided on the other side of the stopper elastic bodies in the inner cylinder axial direction as illustrated in FIGS. 2 and 3, there is no need to distinguish the front and back of the intermediate cylinder 13 in the axial direction when pressing the intermediate cylinder 13 into the inner periphery of the outer cylinder 12, so that the anti-vibration device may be assembled easily.

Although each of the axial stopper portions 15a and 16a is shaped like a rectangular parallelepiped in the embodiment illustrated in FIG. 1, the side surface of the axial stopper portion may be curved along the surface of the intermediate cylinder in the cross section orthogonal to the inner cylinder axial direction. Various other changes may be made to the shape of the axial stopper portion without departing from the scope of the disclosure.

Figure 4:
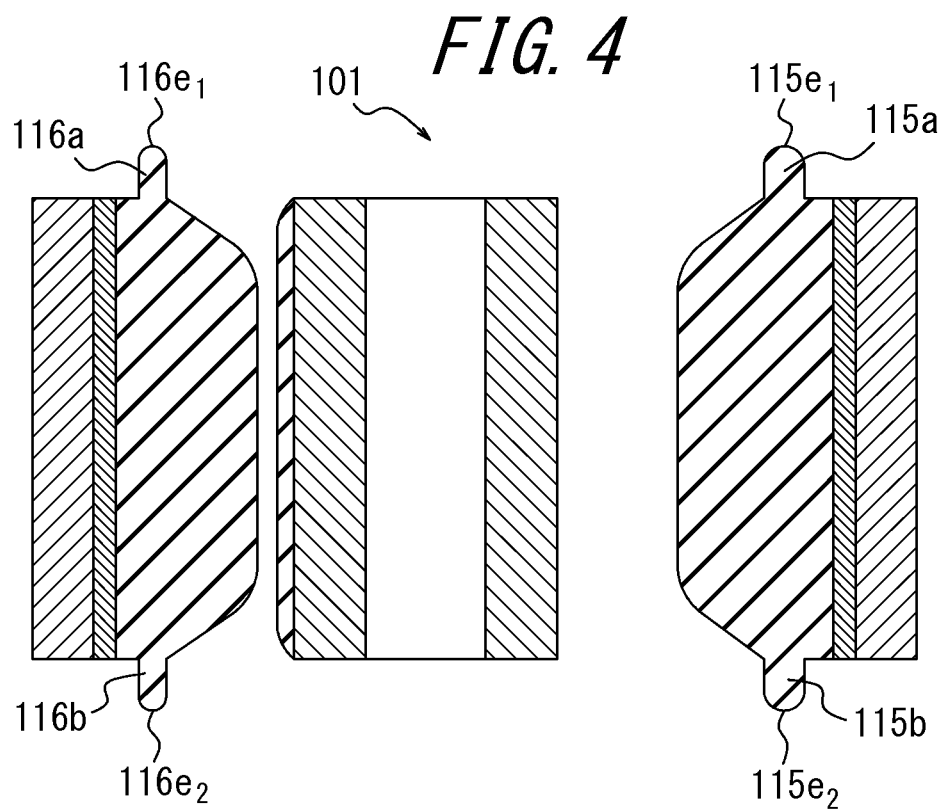
FIG. 4 is a sectional view along the inner cylinder axial direction of a first elastic bush according to another embodiment of the disclosed anti-vibration device.

FIG. 4 is a sectional view of an anti-vibration device 101 according to another embodiment, along the inner cylinder axial direction. In the anti-vibration device 101, outer surface contours $115e_1$, $115e_2$, $116e_1$, and $116e_2$ of outer ends of respective axial stopper portions 115a, 115b, 116a, and 116b in the inner cylinder axial direction each have a curved surface that is convex outward from the axial stopper portion. This enables the axial stopper portion to have such contact with the vehicle body or the like that is initially soft and then gradually becomes firm. The ride quality may be further improved in this way. In addition, the axial stopper portion and the vehicle body or the like may come into contact with each other in such a manner that their contact area increases gradually. Unpleasant contact noise generated when the axial stopper portion and the vehicle body or the like come into contact with each other at once with a large contact area can therefore be suppressed.

Although the axial stopper portion has a convex curved surface in the cross section along the inner cylinder axial direction and including the principal vibration direction in this embodiment, the axial stopper portion may have a convex curved surface in another cross section along the inner cylinder axial direction.

Although the disclosed anti-vibration device is most effectively and preferably applied to a torque rod as illustrated above, a torque rod is not a limitation, and an anti-vibration device such as an engine mount may be formed, for example, with only the above-mentioned first elastic bush.

REFERENCE SIGNS LIST 1, 101 anti-vibration device
10 first elastic bush
11 inner cylinder
12 outer cylinder
13 intermediate cylinder
14 main elastic body
15, 16 stopper elastic body
15a, 15b, 16a, 16b, 115a, 115b, 116a, 116b axial stopper portion
$115e_1$, $115e_2$, $116e_1$, $116e_2$ outer edge of axial stopper portion in inner cylinder axial direction
17, 18 cavity
20 second elastic bush
21 second inner cylinder
22 second outer cylinder
24 second main elastic body
30 connecting rod

The invention claimed is:

1. An anti-vibration device comprising:
an inner cylinder connected to one of a vibration generating portion and a vibration receiving portion;
an outer cylinder connected to the other one of the vibration generating portion and the vibration receiving portion;
an intermediate cylinder pressed in an inner periphery of the outer cylinder;
a main elastic body connecting the inner cylinder and the intermediate cylinder; and
a stopper elastic body independent of the main elastic body, the stopper elastic body being fixed to the intermediate cylinder and facing, in a direction orthogonal to an axial direction of the inner cylinder, the inner cylinder with at least a cavity in between, the cavity being formed through the main elastic body in the axial direction of the inner cylinder,
wherein the stopper elastic body has an axial stopper portion that protrudes beyond the intermediate cylinder and the outer cylinder in the axial direction of the inner cylinder and
wherein the axial stopper portion is arranged only inside the intermediate cylinder in a radial direction of the inner cylinder.

2. The anti-vibration device according to claim 1, wherein a center line of the axial stopper portion is closer to the intermediate cylinder than a center line of the stopper elastic body, in a cross section orthogonal to the axial direction of the inner cylinder.

3. The anti-vibration device according to claim 1, wherein at least one part of the stopper elastic body gradually increases in thickness from a side facing the inner cylinder toward the intermediate cylinder, in a cross section along the axial direction of the inner cylinder.

4. The anti-vibration device according to claim 1, wherein an outer surface contour of an outer end of the axial stopper portion in the axial direction of the inner cylinder has a curved surface that is convex outward from the axial stopper portion.

5. The anti-vibration device according to claim 1, further comprising:
a second inner cylinder whose axial direction is different from the axial direction of the inner cylinder; and
a second outer cylinder connected to the outer cylinder via a connecting rod, and arranged radially outside the second inner cylinder with a second main elastic body in between.

* * * * *